United States Patent Office

3,801,615
Patented Apr. 2, 1974

3,801,615
COLOR REDUCTION PROCESS
Vincent T. Chuang, Marietta, Ohio, assignor to Union
Carbide Corporation, New York, N.Y.
No Drawing. Filed Feb. 1, 1972, Ser. No. 222,680
Int. Cl. C07f 7/18
U.S. Cl. 260—448.8 R    3 Claims

ABSTRACT OF THE DISCLOSURE

The process of reducing undesirable discoloration of oxidatively polymerizable olefinically unsaturated monomers caused by the presence of benzoquinone therein, which comprises adding an amount of an olefinically unsaturated conjugated diene to such discolored monomer in an amount sufficient to form enough Diels-Alder adducts with the benzoquinone present to remove the undesired discoloration caused by the presence of benzoquinone.

---

This invention relates to the reduction of discoloration by benzoquinone present in oxidatively polymerizable olefinically unsaturated monomers.

Many polymerizable olefinically unsaturated monomers used in commerce, such as styrene, α-methyl-styrene, acrylates and methacrylates, have such high reates of polymerization that during their manufacture, particularly when being distilled, they are susceptible to oxidatively induced polymerization in the distillation column, the various pipings, etc., to such an extent that they require the use of stabilizers. One desirable stabilizer is hydroquinone. There is described in copending application Ser. No. 173,653, filed Aug. 20, 1971, the use of a mixture of hydroquinone and benzoquinone to enhance the stabilization of acrylates and methacrylates during their distillation.

The resulting distilled monomer contains in it small quantities of such stabilizers. If the stabilizer is solely hydroquinone, the distilled monomer will be relatively colorless but upon standing over prolonged periods of time it will begin to discolor. It has been determined that such discoloration results from the oxidation of hydroquinone to benzoquinone and the latter possesses a chromophoric group which imparts the undesired discoloration. If the stabilizer of choice is the mixture of hydroquinone and benzoquinone, then the freshly distilled product will possess the objectionable color.

There is described herein a method for removing the discoloration of such monomers which contain benzoquinone therein which is simple to employ, provides instant results, and which will not alter the chemical and physical properties of the discolored monomer being treated. It involves the conversion of the benzoquinone present in the monomer to a harmless, colorless component of the monomer being treated.

The process of this invention involves the addition of a olefinically unsaturated conjugated diene to a polymerizable olefinically unsaturated monomer which monomer contains an amount of benzoquinone sufficient to effect undesirable coloration thereof. The amount of the diene added should be sufficient to form enough Diels-Alder-adducts with benzoquinone present to remove the undesired coloration caused by the presence of benzoquinone.

The theory behind the process of this invention is the removal of chromophoric groups from the polymerizable monomer. It is known that benzoquinone contains a chromophoric group, viz.,

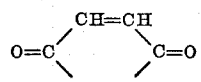

The removal of this group is achieved by converting the ethylenic unsaturation $\alpha,\beta$ to the carbonyl into a saturated radical by reacting benzoquinone with a conjugated diene capable of undergoing a Diels-Alder reaction.

This is illustrated in the following equation where the diene of choice is cyclopentadiene:

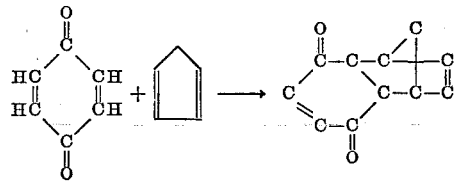

In the above equation, one mole of cyclopentadiene is reacted with one mol of benzoquinone. That ratio may be sufficient to remove enough chromophoric groups from the monomer being treated to provide a satisfactory appearing product. The degree of coloration tolerated by a user of the monomer is typically dependent upon some subjective color standard and, hence, the degree of benzoquione conversion by the process of this invention will be similarly dependent. Total conversion of all of the chromophoric groups provided by the benzoquinone present will totally eliminate that cause of the coloration of the monomer. Hence, optimum color reduction will be achieved when at least 2 moles of conjugated diene are added to the monomer for each mole of benzoquinone present or at least one mole of diene is added for each mole of benzoquinone present followed by enolization of the Diels-Alder adduct through acid catalysis of the adduct to convert the carbonyl to —OH, viz.,

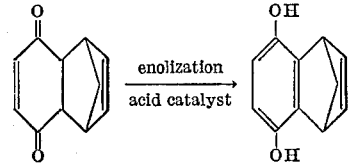

The formation of the Diels-Alder adduct is achieved in accordance with the known Diels-Alder reaction conditions. Such conditions are dependent upon the reactivity of the diene chosen, e.g., some dienes form adducts with benzoquinone at ambient conditions, e.g. room temperature (20° C.–28° C.), while others require higher temperatures, even temperatures above 100° C. No catalyst is ever needed. A limiting factor in the selection of the diene is the polymerizable olefinically unsatuarted monomer being treated. If the monomer is readily oxidized by air, it would not be desirable to employ this process at 100° C. in contact with air. Obviously the monomer being treated, in that case, should be shrouded by an inert gas, such as nitrogen. Even then, it is preferable to employ a diene which forms the Diels-Alder adduct with benzoquinone at a temperature less than about 100° C., and most preferably, at a temperature less than about 70° C.

The aforementioned dienes suitable in the practice of this invention are any of those which will form the Diels-Alder adduct as described above to eliminate the chromophoric radical. Illustrative of such conjugated dienes are those having a molecular weight as low as 54, as illustrated by butadiene, and includes piperylene (cis- and trans-1,3-pentadiene), isoprene, cyclopentadiene, 2-phenylbutadiene, 1,1'-bicyclohexene, 2,3-dimethylbutadiene, 1,3-cyclohexadiene, 1-phenylbutadiene, 9,10-dimethylanthracene, 1,2-dimethylidene cyclohexene, 1,2-diethylidenecyclohexane, 1-methoxybutadiene, 1,1'-bicyclopentene, alloocimene, and the like. some dienes do not form Diels-Alder adducts as quickly as others, hence the slower reacting dienes will generally be employed in larger concentrations and at higher reaction temperatures.

Enolization coupled with adduct formation allows the use of less diene to couple the benzoquinone to remove chromophoric radicals. Enolization is achieved by conventional art recognized techniques such as by acid catalyst induced tautomerization of the adduct. Suitable acid catalysts include gaseous and dry HCl, HF, $H_2SO_4$, trichloroacetic acid, acetic acid, formic acid, and the like.

The amount of acid catalyst employed may range from below about 5 to about 100 or more parts per million based on the weight of the monomer being treated. Room temperatures to 50° C. is an adequate temperature range for operating this reaction.

The polymerizable monomers containing benzoquinone and are treatable according to this invention include styrene, alpha-methylstyrene, beta-chlorostyrene, para-chloromethylstyrene, chloroprene, acrylate and methacrylate esters such as, for example, methyl acrylate, methyl methacrylate, ethyl acrylate, ethyl methacrylate, n-butyl acrylate, n-butylmethacrylate, isobutyl methacrylate, isobutyl acrylate, n-propyl acrylate, n-propyl methacrylate, 2-ethylhexyl acrylate, 2-ethylhexyl methacrylate, n-octyl acrylate, n-octyl methacrylate, octadecyl acrylate, octadecyl methacrylate, phenyl acrylate, phenyl methacrylate, 2-anthracyl acrylate, 2-anthracyl methacrylate, 2-naphthyl methacrylate, 2-naphthyl acrylate, 4,4' - bis(methacryloxy)diphenylmethane,4,4' - bis(acryloxy)diphenyl propane-2, 1,4-bis(methacryloxy)cyclohexane, cyclohexyl acrylate, cyclopentyl acrylate, cyclooctyl methacrylate, 1,2-bis(acryloxy)ethane, the di-methacrylic acid ester of diethylene glycol, 2-hydroxyethyl acrylate, 2-aminoethyl acrylate, 2-aminoethyl methacrylate, 5-methoxy-beta-ethoxy ethyl acrylate, allyl acrylate, allyl methacrylate, glycidyloxy acrylate, glycidyloxy methacrylate, gamma-methacryloxypropyl(trimethoxy)silane, gamma - methacryloxyisobutyl(trimethoxy)silane, gamma-methacryloxypropyl(triethoxy)silane, gamma-methacryloxypropyl[tris(beta-methoxy ethoxy)[silane, and the like.

Though the following examples examples depict specific modes for practicing this invention, it is not intended that this invention shall be limited to that which is depicted in the examples.

EXAMPLE 1

Gamma-methacryloxypropyltrimethoxysilane (containing 500 parts per million, p.p.m., by weight of benzoquinone) (100 g.) with 2–3 GVS color was treated with 0.1 g. of freshly distilled cyclopentadiene. The color went down to less than 50 Pt—Co in 20 min. at ambient (room —25° C.) temperatures. "GVS" means Gardner Vanish Standard. GVS is about 150 Pt—Co standard.

EXAMPLE 2

Gamma-methacryloxypropyltrimethoxysilane (containing 100 p.p.m. by weight of benzouinone) with 80 Pt—Co color was likewise treated with 0.1 weight percent of piperylene (1,3-pentadiene). No color change was apparent. At 0.4% of piperylene, the color dropped to less than 60 Pt–Co. Isoprene and alloocimene showed about the same effectiveness.

What is claimed is:

1. The process of reducing undesirable discoloration of oxidatively polymerizable olefinically unsaturated monomers caused by the presence of benzoquinone therein, which comprises adding an amount of an olefinically unsaturated conjugated diene to such discolored monomer in an amount sufficient to form enough Diels-Alder adducts with the benzoquinone present to remove the undesired discoloration caused by the presence of benzoquinone.

2. The process of claim 1 wherein the monomer is an acrylate.

3. The process of claim 2 wherein the acrylate is gamma-methacryloxypropyltrimethoxysilane.

References Cited

Butz et al., The Diels-Alder Reaction; Quinones and other Cyclenones, "Organic Reactions," 5, 1949, pp. 140–144.

DANIEL E. WYMAN, Primary Examiner

P. F. SHAVER, Assistant Examiner

U.S. Cl. X.R.

252—399, 404; 260—448.2 E